(12) United States Patent
Sundaresan et al.

(10) Patent No.: US 7,966,335 B2
(45) Date of Patent: *Jun. 21, 2011

(54) COLLABORATIVE CONTENT EVALUATION

(75) Inventors: Neelakantan Sundaresan, Mountain View, CA (US); Hendrick Lee, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/772,938

(22) Filed: May 3, 2010

(65) Prior Publication Data

US 2010/0211514 A1 Aug. 19, 2010

Related U.S. Application Data

(63) Continuation of application No. 11/646,888, filed on Dec. 28, 2006, now Pat. No. 7,711,684.

(51) Int. Cl.
*G06F 7/00* (2006.01)
*G06F 17/30* (2006.01)
(52) U.S. Cl. .................. 707/748; 707/770; 707/805
(58) Field of Classification Search .............. 707/748, 707/770, 805; 705/10, 27, 37; 709/223, 709/225
See application file for complete search history.

(56) References Cited

U.S. PATENT DOCUMENTS

| | | | |
|---|---|---|---|
| 7,275,102 B2 * | 9/2007 | Yeager et al. ............... 709/223 |
| 7,308,496 B2 * | 12/2007 | Yeager et al. ............... 709/223 |
| 7,328,243 B2 * | 2/2008 | Yeager et al. ............... 709/208 |
| 7,533,090 B2 * | 5/2009 | Agarwal et al. ......... 707/999.007 |
| 7,711,684 B2 | 5/2010 | Sundaresan et al. |
| 7,853,600 B2 * | 12/2010 | Herz et al. .................... 707/748 |
| 2002/0138402 A1 * | 9/2002 | Zacharia et al. ............... 705/37 |
| 2003/0004846 A1 * | 1/2003 | Schneider ....................... 705/10 |
| 2003/0172050 A1 | 9/2003 | Decime et al. |

(Continued)

FOREIGN PATENT DOCUMENTS

WO  WO-2008082597 A2  7/2008

(Continued)

OTHER PUBLICATIONS

Damiani et al.—"Fuzzy Techniques for Trust and Reputation Management in Anonymous Peer-to-Peer Systems"—Sep. 10-12, 2003, Zittan Germany (pp. 1-17).*
Krit Wongrujira & Aruna Seneviratne—"Monetary Incentive with Reputation for Virtual Market-Place Based P2P"—CONEXT'05, Toulous, France, Oct. 21-27, 2005 (2005 ACM) (pp. 135-145).*

(Continued)

*Primary Examiner* — John Breene
*Assistant Examiner* — Anh Ly
(74) *Attorney, Agent, or Firm* — Schwegman, Lundberg & Woessner, P.A.

(57) ABSTRACT

In an example embodiment, a system for determining respective reputation values for a users of a network-based community is provided. The respective reputation values may be based on a user attribute associated with the user. The system may comprise a processor-implemented reputation component configured to determine respective reputation values for one or more users of a network-based community. Additionally included is a processor-implemented reporting component configured to receive a communication from the user identifying content as objectionable within the network-based community. The system also includes a processor-implemented evaluation component configured to evaluate the identified content based on the respective reputation values of the user to determine an action to take with respect to the content. Additionally included is a processor-implemented validation component configured to remove identified content from publication based on the respective reputation values transgressing a threshold value.

18 Claims, 5 Drawing Sheets

U.S. PATENT DOCUMENTS

| | | | |
|---|---|---|---|
| 2004/0054661 A1* | 3/2004 | Cheung et al. | 707/3 |
| 2005/0209709 A1 | 9/2005 | Bradshaw | |
| 2005/0216300 A1 | 9/2005 | Appelman et al. | |
| 2006/0069667 A1 | 3/2006 | Manasse et al. | |
| 2006/0235824 A1 | 10/2006 | Cheung et al. | |
| 2006/0253458 A1* | 11/2006 | Dixon et al. | 707/10 |
| 2006/0253580 A1 | 11/2006 | Dixon et al. | |
| 2006/0253584 A1 | 11/2006 | Dixon et al. | |
| 2007/0078671 A1 | 4/2007 | Dave et al. | |
| 2007/0100698 A1 | 5/2007 | Neiman et al. | |
| 2007/0130350 A1 | 6/2007 | Alperovitch et al. | |
| 2007/0192349 A1* | 8/2007 | Farr et al. | 707/102 |
| 2008/0015925 A1 | 1/2008 | Sundaresan | |
| 2008/0046216 A1 | 2/2008 | Thomas | |
| 2008/0059536 A1 | 3/2008 | Brock et al. | |
| 2008/0097772 A1 | 4/2008 | Brown et al. | |
| 2008/0114629 A1 | 5/2008 | Pavlov | |
| 2008/0162265 A1 | 7/2008 | Sundaresan et al. | |

FOREIGN PATENT DOCUMENTS

| WO | WO-2008082597 A3 | 7/2008 |
|---|---|---|

OTHER PUBLICATIONS

"International Application Serial No. PCT/US2007/026397, Search Report and Written Opinion mailed on Oct. 22, 2008", 11 pgs.

Conti, et al., "Content delivery policies in replicated web services: client-side vs. server-side", *Cluster Computing*, vol. 8, No. 1, (Jan. 2005), 47-60 Pgs.

Kaushik, et al., "Email feedback: a policy-based approach to overcoming false positives", proceedings of the 2005 ACM workshop on Formal methods in security engineering, session 2, (2005), 73-82 Pgs.

Milan, et al., "Performance Anal~sis of reputation-based Mechanisms for multi-hop wireless networks", *Information science and systems,40t annual conference, IEEE*, (Mar. 22-24, 2006), 12-17 Pgs.

"U.S. Appl. No. 11/646,888, Final Office Action mailed May 14, 2009", 21 pgs.

"U.S. Appl. No. 11/646,888, Response filed Oct. 14, 2009 to Final Office Action mailed May 14, 2009", 10 pgs.

"U.S. Appl. No. 11/646,888, Response filed Mar. 2, 2009 to Non-Final Office Action mailed Oct. 29, 2008", 12 pgs.

"U.S. Appl. No. 11/646,888, Non-Final Office Action mailed Oct. 29, 2008", 20 pgs.

"U.S. Appl. No. 11/646,888, Notice of Allowance mailed Dec. 15, 2009", 14 Pgs.

"International Application Serial No. PCT/US2007/026397, Search Report and Written Opinion mailed on Oct. 22, 2008", p. 220, 11 pgs.

Conti, et al., "Content delivery policies in replicated web services: client-side vs. server-side", Cluster Computing, vol. 8, No. 1, (Jan. 2005), 47-60 Pgs.

Milan, et al., "Performance Analysis of reputation-based Mechanisms for multi-hop wireless networks", Information science and systems,40t annual conference, IEEE, (Mar. 22-24, 2006), 12-17 Pgs.

\* cited by examiner

US 7,966,335 B2

1

COLLABORATIVE CONTENT EVALUATION

RELATED APPLICATIONS

This application is a continuation of U.S. application Ser. No. 11/646,888, filed on Dec. 28, 2006, now U.S. Pat. No. 7,711,684 B2, entitled "Collaborative Content Evaluation," which is incorporated herein by reference in its entirety.

TECHNICAL FIELD

This application relates to a method and system for evaluating content data.

BACKGROUND

As online applications mature, users and merchants increasingly communicate and participate in a variety of transactions and commerce with each other. Buyers and sellers (e.g., individuals and merchants) transact with each other based on good faith and whatever knowledge they may have about each other as transacting parties and/or members of the transacting community. However, as in any community, their may be users that attempt to cause other users harm or violate policies set forth by the network-based administrator. For example, a user may try to defraud other users by misrepresenting a product in a listing, harm another user through malicious postings, etc. (e.g., reviews, etc.), or have unfair business practices (e.g., inconsistent shipping charges).

BRIEF DESCRIPTION OF THE DRAWINGS

The present invention is illustrated by way of example, and not by way of limitation, in the figures of the accompanying drawings in which.

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a system and method to generate user reputation values includes a network system (e.g., a network-based community/publisher) to determine a reputation value for one or more users of a network-based community, the reputation value being based on one or more user attributes associated with the one or more users. Content (e.g., a fraudulent listing) may then be evaluated based on the reputation value of the one or more users, the content being received in one or more communications from the respective one or more users identifying the content as objectionable within the network-based community. In one embodiment, the reputation value of a user may be adjusted by the network system based on validating the objectionable content.

In another embodiment, the network system receives a communication from one or more users associated with a network-based community, the communication providing content identified by the one or more users as objectionable within the network-based community. The system may then take an action with respect to the content based on a reputation value associated with the one or more users.

Figure 1:
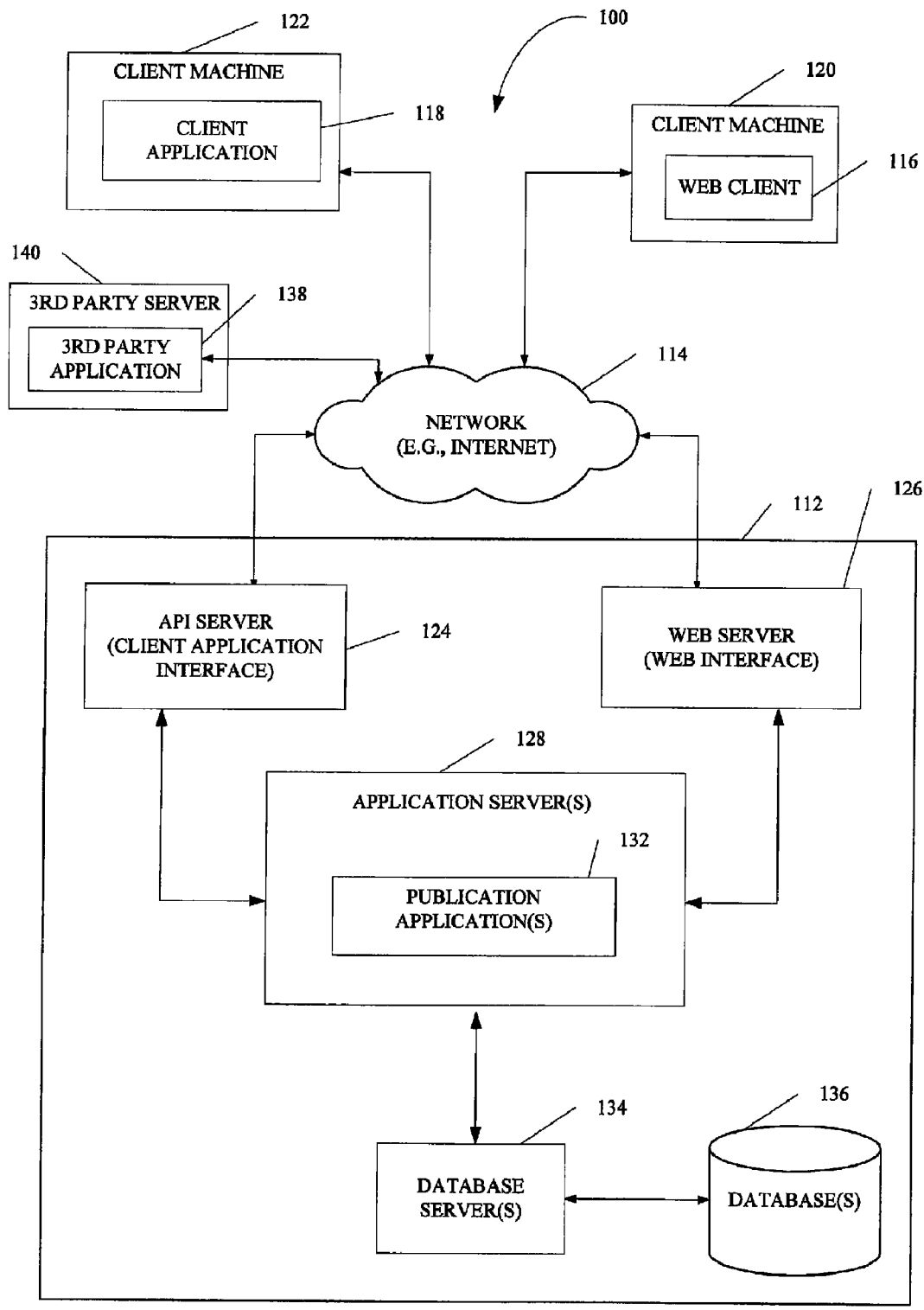
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a publication/publisher system where clients may communicate and exchange data with the network system 100. The data may pertain to various functions (e.g., online item purchases) and aspects (e.g., managing content and user reputation values) associated with the network system 100 and its users. Although illustrated herein as a client-server architecture for simplicity, other embodiments may include other network architectures such as a peer machine in a peer-to-peer (or distributed) network environment.

A data exchange platform, in an example form of a network-based publisher 112, may provide server-side functionality, via a network 114 (e.g., the Internet) to one or more clients. The one or more clients may include users that utilize the network system 100 and more specifically, the network-based publisher 112, to exchange data over the network 114. These transactions may include transmitting, receiving (communicating) and processing data to, from, and regarding content and users of the network system 100. The data may include, but is not limited to, content and user data such as feedback data, user reputation values, user profiles, user attributes, product and service reviews, product, service, manufacture, and vendor recommendations and identifiers, product and service listings associated with buyers and sellers, auction bids, etc.

In various embodiments, the data exchanges within the network system 100 may be dependent upon user selected functions available through one or more client/user interfaces (UIs). The UIs may be associated with a client machine, such as a client machine 120 utilizing a web client 116. The web client 116 may be in communication with the network-based publisher 112 via a web server 126. The UIs may also be associated with a client machine 122 utilizing a client application 118, or a third party server 140 hosting a third party application 138. It can be appreciated in various embodiments the client machine 120, 122, or third party application 138 may be associated with a buyer, a seller, payment service provider or shipping service provider, each in communication with the network-based publisher 112 and optionally each other. The buyers and sellers may be any one of individuals, merchants, service providers, etc.

Turning specifically to the network-based publisher 112, an application program interface (API) server 124 and a web server 126 are coupled to, and provide programmatic and web interfaces respectively to, one or more application servers 128. The application servers 128 host one or more publication application (s) 132. The application servers 128 are, in turn, shown to be coupled to one or more database server(s) 134 that facilitate access to one or more database(s) 136.

In one embodiment, the web server 126 and the API server 124 communicates and receives data pertaining to a user reporting objectionable content (e.g., fraudulent listing, over priced shipping, etc.) via various user input tools. For example, the web server 126 may send and receive data to and from a toolbar or webpage on a browser application (e.g., web client 116) operating on a client machine (e.g., client machine 120). The API server 124 may send and receive data to and from an application (e.g., client application 118 or third party application 138) running on another client machine (e.g., client machine 122 or third party server 140).

The publication application(s) 132 may provide a number of publisher functions and services (e.g., listing, payment, etc.) to users that access the network-based publisher 112. For example, the publication application(s) 132 may provide a number of services and functions to users for reviewing and providing feedback about transactions and associated users. Additionally, the publication application(s) 132 may determine a reputation value for one or more users of a network-based community, the reputation value being based on one or more user attributes associated with the one or more users and content (e.g., fraudulent listing) may then be evaluated based on the reputation value of the one or more users, the content being received in a communication from the one or more users identifying the content as objectionable within the network-based community (e.g., network system 100). The publication application(s) 132 may then adjust the reputation value of a user based on validating the content as objectionable within the system. Additionally, the publication application(s) 132 may take an action with respect to the content identified as objectionable based on a reputation value associated with the one or more users.

In various embodiments, rules may be applied to determine when content flagged as objectionable is at least one of reported to a system administrator (e.g., a customer service representative), removed without reporting, provided to one or more other reputable users for evaluation, or any combination thereof.

In one embodiment, the publication application(s) 132 may provide a user via a client (e.g., web client 116) with an interface that includes input fields for reporting objectionable content that may be posted or otherwise associated with the network-based publisher 112. For example, the user may determine an item or information listed on the network-based publisher 112 is a fraudulently represented item, an item contrary to policy (e.g., listing of a body part, etc.), content attempting to damage a reputation of another user, or content pertaining to unfair or bad business practices (e.g., inconsistent or overpriced shipping). The user may then communicate to the network-based publisher 112 the objectionable content pertaining to the listing and/or objectionable conduct and associated content of another user for evaluation and action (e.g., internally or by the community of users). For simplicity hereafter, the reporting of objectionable content also implies a reporting of the associated objectionable conduct of the one or more users associated with the objectionable content.

FIG. 1 also illustrates a third party application 138 that may execute on a third party server 140 and may have programmatic access to the network-based publisher 112 via the programmatic interface provided by the API server 124. For example, the third party application 138 may utilize information retrieved from the network-based publisher 112 to support one or more features or functions on a website hosted by the third party. The third party website may, for example, provide one or more objectionable content reporting mechanisms, feedback, social networking, publisher or payment functions that are supported by the relevant applications of the network-based publisher 112.

Figure 2A:
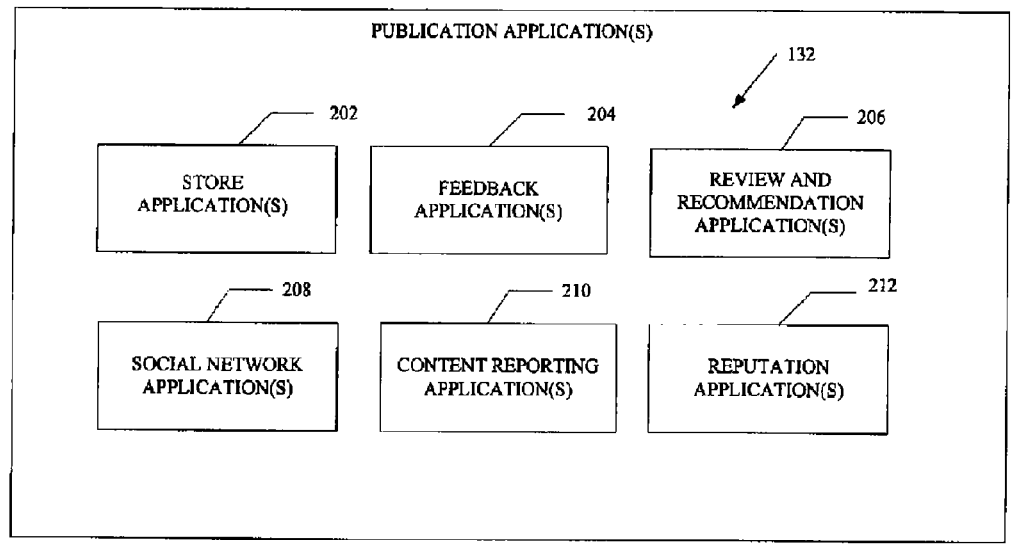
FIG. 2A is a block diagram illustrating an example embodiment of multiple publication applications, which may be provided as part of a network-based publisher.

FIG. 2A is a block diagram illustrating an example embodiment of multiple publication application(s) 132, which are provided as part of the network-based publisher 112. The network-based publisher 112 may provide a multitude of reporting, feedback, reputation, social networking, and listing and price-setting mechanisms whereby a user may report objectionable content and possibly associated conduct found on the network-based publisher 112, or may be a seller or buyer that may list or buy goods and/or services (e.g., for sale) published on the network-based publisher 112.

The publication application(s) 132 are shown to include one or more application(s) which support the network-based publisher 112, and more specifically, the generation of reputation values for users based on user attributes, the reporting of objectionable content by those users, and subsequent action by the network-based publisher 112 based on the reported content and the reputation value of the user(s).

Store application(s) 202 may allow sellers to group their listings (e.g., goods and/or services) within a "virtual" store, which may be branded and otherwise personalized by and for the sellers. Such a virtual store may also offer promotions, incentives and features that are specific and personalized to a relevant seller. In one embodiment, a seller using a virtual store to sell their goods and services may result in the network-based publisher 112 determining a higher reputation value because of an inherent trustworthiness (e.g., higher reputation value) of a "business" over an individual seller.

Feedback application(s) 204 may allow parties that transact utilizing the network-based publisher 112 to establish, build, and maintain buyer/seller reputations, which may be made available and published to potential trading partners (e.g., users of the network-based publisher 112). Consider, for example, where the network-based publisher 112 supports person-to-person trading, users may have no history or other reference information whereby the trustworthiness and/or credibility of potential trading partners may be assessed. The feedback application(s) 204 may allow a first user, for example through feedback provided by other users, to establish a buyer/seller reputation within the network-based publisher 112 over time and transactions. Thus, other potential transaction partners (users) may then reference the buyer/seller reputation value of the user for the purpose of assessing credibility, trustworthiness, etc.

It can be appreciated by one skilled in the art that users may have a multitude of various types of reputation values in the network-based publisher 112. For example, a user may have a reputation value for being a buyer, one as a seller, and another as an objectionable content identifier. Additionally, the reputation value types may have an impact on one another. For example, a user having a high buyer/seller reputation value may as a result have a higher reputation value for identifying objectionable content than someone with a very low or negative buyer/seller reputation value. However, for simplicity, a reputation value as used hereafter will refer primarily to a value associated with a user's accuracy for identifying objectionable content.

In an example embodiment, the network-based publisher 112 may include review and recommendation application(s) 206. Social networking application(s) 208 may work in conjunction with the review and recommendation application(s) 206 to provide a user interface to facilitate the entry of content such as reviews and recommendations of products and services to other users or communities/groups of users. A review may be a text entry of the community group member's opinion, a standard review form including check boxes indicating a level satisfaction, or a combination of both, etc.

Recommendations may include a specific type of item, a specific brand or service for a type of item, a specific retailer for the item, etc. In one embodiment, providing a community service, such as reviews and recommendations to the network-based publisher 112 may result in a perception of a higher reputation or rating in the community (e.g., more trustworthy). This may be recognized by a weighting function determining a higher weighted value to calculate the first user's overall reputation value.

Social networking application(s) 208 may support social networking functions, including building and maintaining community groups joined or created by a user. For example, one of the social networking functions may be used to determine a user attribute (e.g., numerical value) associated with a user creating, belonging, and participating in a community group. A user may have a higher rating in the community (e.g., more trustworthy) based on community participation and association (e.g., moderator, review publisher, etc.). The higher rating may then result in the determination of a higher reputation value over a user not participating in the community through group associations, leadership, etc.

In one embodiment, content reporting application(s) 210 may be used to receive content communicated in an example form of a report to the network-based publisher 112 via a client machine (e.g., client machine 120). The content reporting application(s) 210 may provide data to the web server 126 (e.g., interface data) and the API server 124 to facilitate the communicating of the report of objectionable content. In addition to receiving the report, the content reporting application(s) 210 may facilitate the retrieval of user information corresponding to the user communicating the report. For example, user name and reputation value from the database(s) 136 through the database server(s) 134.

In one embodiment, reputation application(s) 212 may work in conjunction with the content reporting application(s) 210 to determine one or more reputation values associated with a user in the network system 100. As described above, this may be based on one or more user attributes. The user attributes may include, but are not limited to, a history of accurately reporting objectionable content, a reputation value of a user validating a report originating from another user, a current reputation value, a value of the transaction, prior transaction values associated with the user, prior transaction values associated with one or more other users, number of prior transactions of the first user, number of prior transactions of the one or more other users, group association of a user, community service and participation (e.g., writes reviews, etc.), an imported reputation value, and a category of transaction including a user's expertise (e.g., power seller) in a category. Additionally, some or all of these attributes may have values or weights assigned to them that may be used in conjunction with other values and factors to determine a reputation value of a user.

After a use reports content via the content reporting application(s) 210, the network-based publisher 112 may then take action with respect to the reporting user or users and the reported content. The action taken with respect to the reported content and the user may be based on the reputation value of the user and optionally other users.

Additionally, the content reporting application(s) may apply one or more rules to determine when content flagged as objectionable. These rules may include at least one of reporting the content to a system administrator (e.g., a CSR (customer service representative)) for investigation and confirmation, removing the content without reporting it to a CSR, providing it to one or more other reputable users for evaluation, or any combination thereof. For example, it may take three users of a medium reputation or just one user of a high reputation to identify a listing as fraudulent resulting in the listing being automatically pulled from the network-based publisher 112. In another example, a low reputation user reporting a listing as fraudulent may be overridden by one highly reputable user indicating the listing is not fraudulent resulting in no action taken with respect to the listing.

Figure 2B:
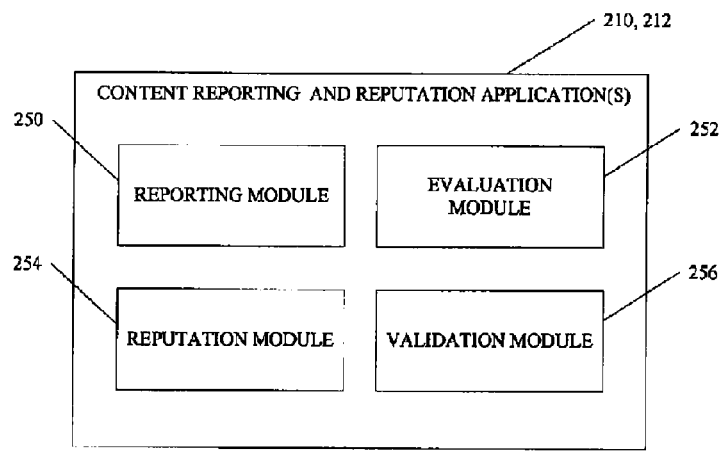
FIG. 2B is a block diagram illustrating an example embodiment of a various modules that may used to execute the processes described herein.

FIG. 2B is a block diagram illustrating an example embodiment of a reporting module 250, an evaluation module 252, a reputation module 254, and a validation module 256, which may be utilized by the content reporting application(s) 210 and the reputation application(s) 212 to receive a report of objectionable content, determine or adjust a reputation value of users, validate a report, and evaluate and take action with respect to the reported content and reporting user.

In one embodiment, the reporting module 250 may receive a communication from one or more users reporting objectionable content. The reporting module 250 may then retrieve additional data associated with each reporting user from the database(s) 136. In another embodiment, the reporting module 250 retrieves embedded user data from each communicated report.

The evaluation module 252 may evaluate the communication containing the objectionable content received from the user(s). In one embodiment, the evaluation module 252 works in conjunction with a reputation module 254 to retrieve user attributes, such as the current reputation value of the user(s), if any. Additionally, the evaluation module 252 may categorize the reported content by various methods, such as a keyword analysis, manual entry (e.g., by a CSR), and by reading a field in the communication that includes a user entry indicating the type of content. Then based on the current reputation value, the evaluation module 252 determines how to treat the reported content. Examples of this treatment are illustrated and discussed in further detail with reference to FIG. 3.

The validation module 256 may work in conjunction with the evaluation module 252 and reputation module 254 to determine if the reported content is objectionable and based on that determination how to determine or adjust the reporting user(s) reputation value, if at all. Examples of the determining or adjusting of the reputation value are illustrated and discussed in further detail with reference to FIG. 3. Additionally, in various embodiments the validation module 256 may with respect to the objectionable or flagged content, report it to a system administrator (e.g., a CSR for confirmation), remove it without reporting to a CSR, provide it to one or more other reputable users for further evaluation, or any combination thereof, as discussed above.

Figure 3:
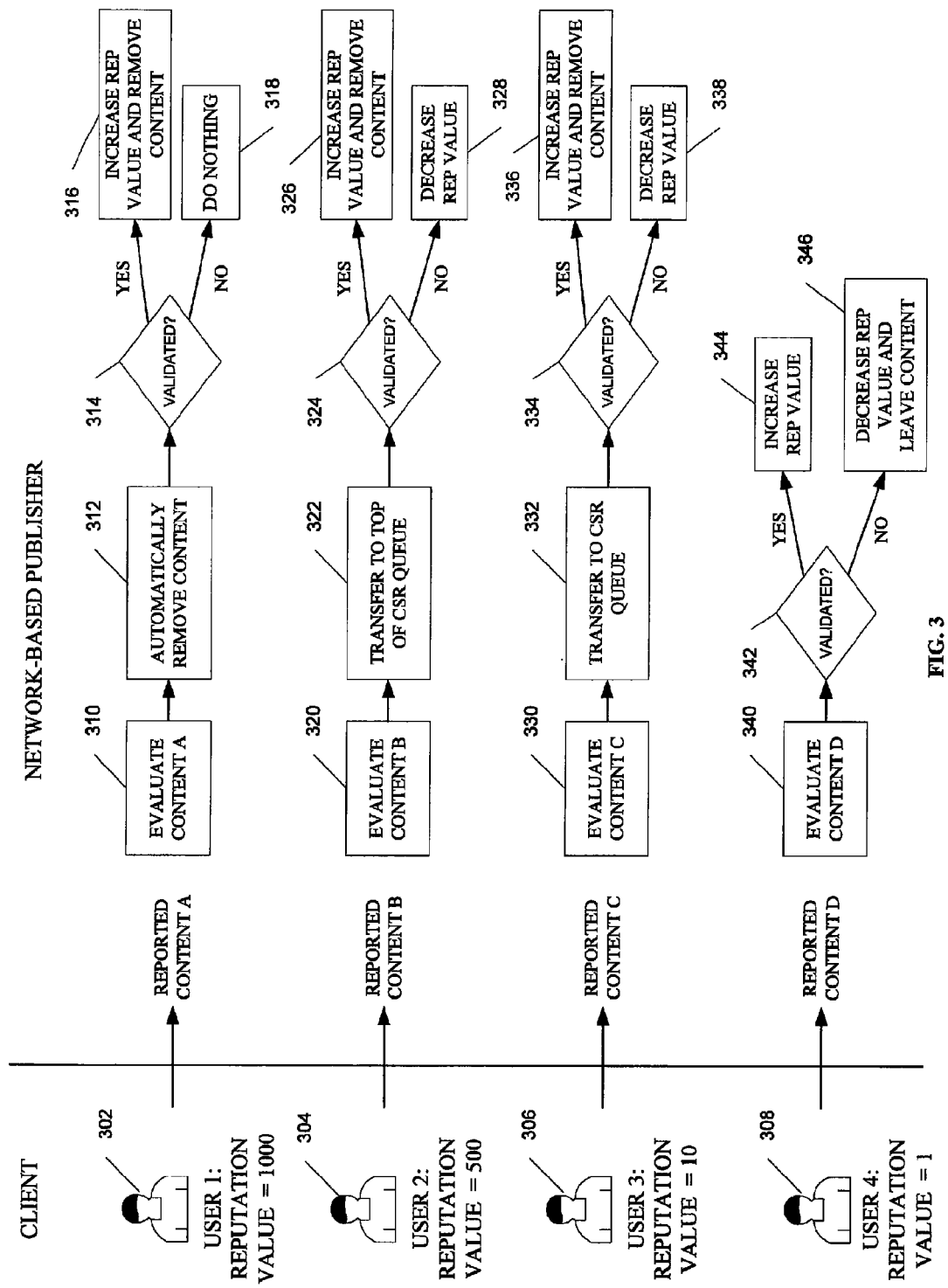
FIG. 3 is a block diagram of an example embodiment illustrating a flow of four reports through the network system.

FIG. 3 is a block diagram of an example embodiment illustrating a flow of four reports through the network system 100. On the client side, there are four users representing four clients of the network system 100 (e.g., four client machines 120, 122), the users reporting content A through D, respectively, and each user has a different reputation value. User 302 has a reputation value of 1000, user 304 has a reputation value of 500, user 306 has a reputation value of 10, and user 308 has a reputation value of 1.

In one embodiment, the network-based publisher 112 receives, evaluates, and takes action with respect to the reported content based on a user's reputation value. In some embodiments, based on the validation of the content by the network-based publisher 112, a new or adjusted reputation value is determined for the reporting user(s). In other embodiments, the evaluation and action taken with respect to the reported content is based on a user's reputation value exceeding, falling below, or falling within a range of upper and lower threshold values. For example, content reported by a user having a reputation value of greater than a threshold value of 900 may be automatically removed. The content reported by a user having a value above 100 but less than 900 may result in the content being transferred for validation or require concurrent reporting by one or more other users. The content reported by a user having a value less than 10 may result in the content being ignored unless concurrently validated by some combination of fewer users with high reputation values or many users with low reputation values.

In various embodiments, rules are created to determine action to take with respect to the content based on varying combinations of reporting users. For example, as discussed above, it may take three users of a medium reputation (e.g., user 304 of reputation 500) or just one user of a high reputation (e.g., user 302 of reputation 1000) to identify a listing as fraudulent resulting in the listing being automatically pulled from the network-based publisher 112. In another example, a low reputation user (e.g., user 306 of reputation value 10) reporting a listing as fraudulent may be overridden by one highly reputable user (e.g., user 302 of reputation 1000) indicating the listing is not fraudulent. It can be appreciated the threshold values and user combinations in taking action and validating are configurable within the network system 100.

Additionally, in various embodiments, the evaluation may include analyzing additional attributes associated with the reported content. For example, other content attributes may include, but are not limited to category and risk value. A category of jewelry having a risk value of $100,000 USD may be treated differently (e.g., automatically referred to an administrator, such as a CSR) than a cookie recipe having a value of 5.00 USD, which may be automatically removed depending on the creditability of the reporting user as assessed by the reputation value.

In the first example, user 302 reports content A. At block 310 the submission of the content is evaluated. In various embodiments, this may include retrieving user attributes (e.g., current reputation value, etc.) associated with the user 302 and categorizing the type of content. In one embodiment, the categorizing may be used in conjunction with the user's 302 reputation value to determine a course of action to take with respect to the content. For example, if the user 302 has a strong buyer/seller reputation in the category associated with the report the network-based publisher 112 at block 312 may automatically remove the content without consuming additional resources of the network-based publisher 112. However, if in a category outside of the expertise of the user 302 a different course of action may be taken, such as validating the content (as objectionable) at block 314.

In one embodiment, the course of action may be to transfer the reported content as a "case" an administrator, such as a CSR. The content placement in the CSR queue may be directly proportional to the user's 302 reputation value. In another embodiment, the administrator(s) may be one or more other users. The content may be communicated to the one or more other users who may have an expertise or familiarity in the category associated with the reported content A. In the examples described herein, validating may also include checking if other users have also reported the same content and taking action accordingly and evaluation may also include factoring in other content attributes (e.g., risk value, category, etc.) as described above. In any case, if validated at block 314 the reputation value of the user 302 may be increased and the content removed at block 316. If not validated, because the user 302 has a reputation value of 1000, the network-based publisher 112 may consider the report a mistake and elect to not decrease the reputation value of the user 302 at block 318.

In the next example embodiment, user 304 has a reputation value of 500 and reports content B to the network-based publisher 112. After the content B is evaluated at block 320, in this embodiment, based on the reputation value of 500 the content is transferred to the top of a CSR queue at block 322. In another embodiment, as described above, the content may be transferred to a user having a higher reputation value in the category of the content for validation instead of the CSR. If validated, at block 324, the reputation value of the user 304 may be increased and the content removed at block 326. If not validated, then the reputation value of the user 304 may be decreased at block 328 and the content left on the system.

In the next example embodiment, user 306 has a reputation value of 10 and reports content C to the network-based publisher 112. After the content C is evaluated at block 330, based on the reputation value of 100, the content is transferred to the CSR queue according to standard priority at block 332. As discussed above, the priority may be based on first in first out or may be dependent upon other content attributes, such as category or risk value. In another embodiment, as described above, the content may be transferred to a user(s) having a higher reputation value in the category of the content for validation instead of a CSR. If validated, at block 334, the reputation value of the user 306 may be increased and the content removed at block 336. If not validated, then the reputation value of the user 306 may be decreased at block 338 and the content left on the system.

In the next example embodiment, user 308 has a reputation value of 1 and reports content D to the network-based publisher 112. After the content D is evaluated at block 330, in this embodiment, based on the reputation value of 1 the content is validated at block 342. As discussed above, this may include being concurrently validated by other users reporting content D or by the content being transferred to a user having a high reputation value in the category. Again, the evaluation may also depend on assessing other content attributes as described above. If validated, at block 344, the reputation value of the user 308 may be increased and the content removed. If not validated, then at block 346 the reputation value of the user 306 may be decreased, if possible, and the content left on the system.

Figure 4:
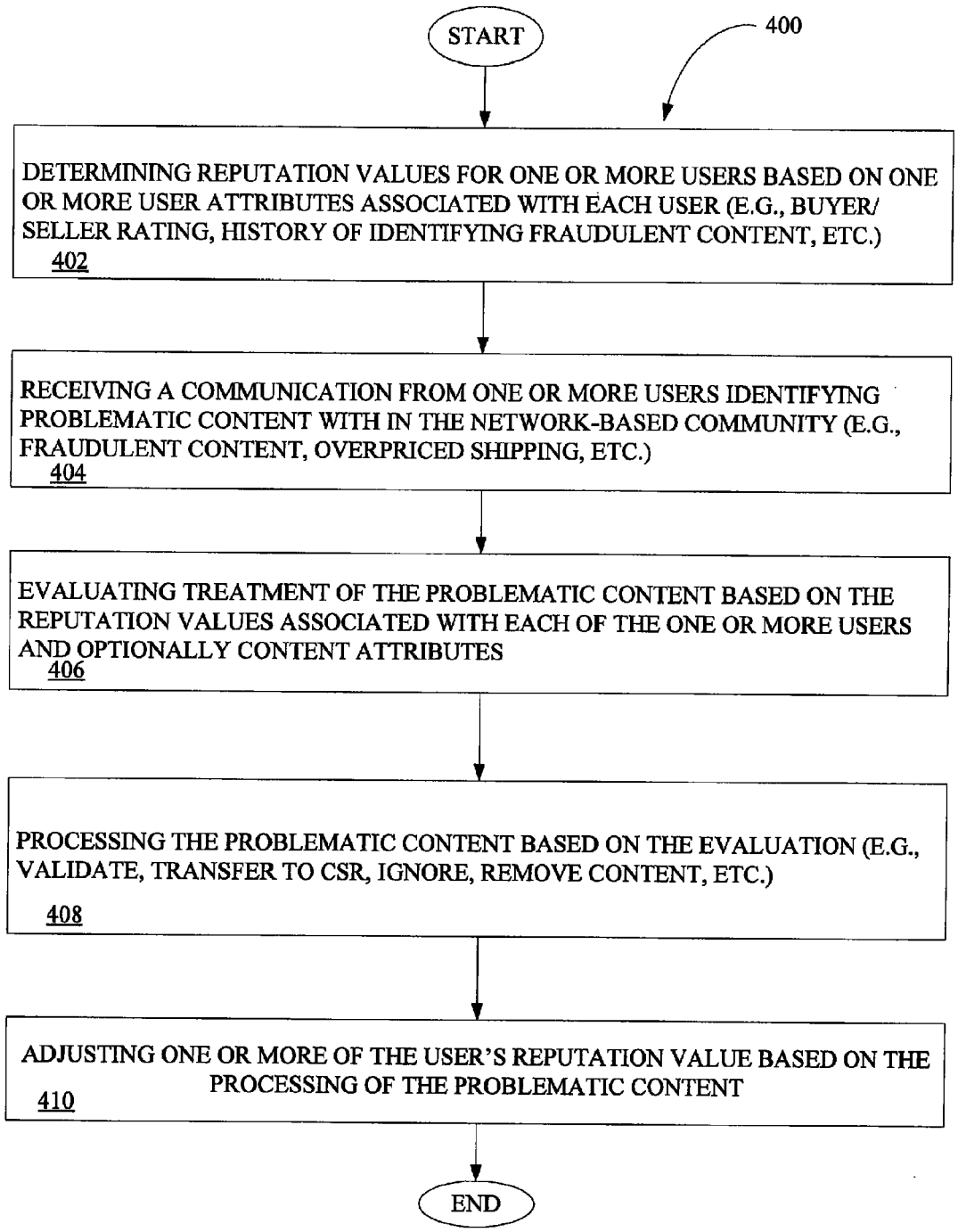
FIG. 4 is a flow chart 400 illustrating at a high level operations for determining a user reputation value, evaluating received content, and taking action with respect to the content based on the user reputation value.

FIG. 4 is a flow chart illustrating at a high level operations for determining a user reputation value, evaluating received content, and taking action with respect to the content based on the user reputation value. At operation 402, reputation values for one or more users are determined based on one or more user attributes associated with each user (e.g., buyer/seller rating, history of identifying fraudulent content, etc.). At operation 404, a communication is received from one or more users identifying problematic content within the network-based community (e.g., fraudulent content, overpriced shipping, etc.) The problematic content is evaluated, at operation 406, based on the reputation values associated with each of the one or more users and optionally additional content attributes, such as category of content and risk value of content (e.g., a $100,000 USD fraudulent listing). At operation 408, the problematic content is processed based on the evaluation. For example, as discussed above, the content may be removed, transferred to a CSR and/or another for validation, or left on the system (no action taken). Lastly, at operation 410, the one or more of the user's reputation values may be determined (e.g., created or adjusted) based on the processing of the problematic content.

Figure 5:
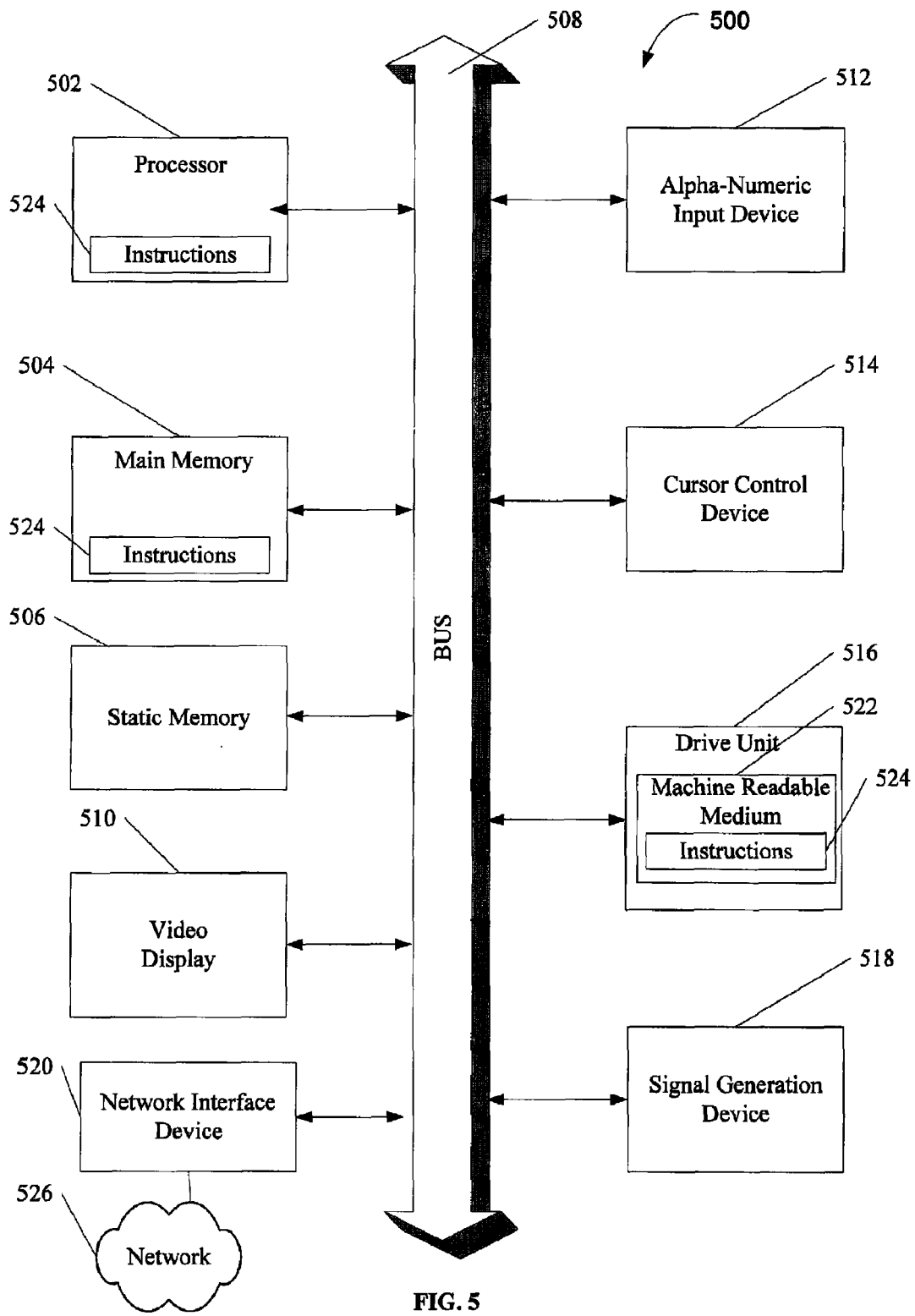
FIG. 5 shows a diagrammatic representation of machine in the example form of a computer system within which a set of instructions may be executed causing the machine to perform any one or more of the methodologies discussed herein.

FIG. 5 shows a diagrammatic representation of machine in the example form of a computer system 500 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a non-transitory machine-readable storage medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting non-transitory machine-readable storage media.

The software 524 may further be transmitted or received over a network 526 via the network interface device 220 utilizing any one of a number of well-known transfer protocols (e.g., HTTP).

While the non-transitory machine-readable storage medium 522 is shown in an example embodiment to be a single medium, the term "non-transitory machine-readable storage medium" should be taken to include a single medium or multiple media (e.g., a centralized or distributed database, and/or associated caches and servers) that store the one or more sets of instructions. The term non-transitory "machine-readable storage medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "non-transitory machine-readable storage medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
a processor;
a processor-implemented reputation component configured to determine respective reputation values for a user of a network-based community, the respective reputation values being based on a user attribute associated with the user;
a processor-implemented reporting component configured to receive a communication from the user identifying content as objectionable within the network-based community;
a processor-implemented evaluation component configured to evaluate the identified content based on the respective reputation values of the user to determine an action to take with respect to the content; and
a processor-implemented validation component configured to remove the identified content from publication based on the respective reputation values greater than a threshold value,
wherein the processor-implemented evaluation component is configured to present the identified content to an administrator selected from a list of administrators including a customer service representative and one or more users having respective reputation values greater than a threshold value.

2. The system of claim 1, wherein the processor-implemented evaluation component is configured to evaluate the identified content based on a content attribute.

3. The system of claim 1, wherein the processor-implemented evaluation component is configured to remove the identified content based on a result of the evaluation of the identified content.

4. The system of claim 1, wherein the processor-implemented evaluation component is configured to remove the identified content based on the respective reputation values for the user greater than the threshold value.

5. The system of claim 1, wherein the processor-implemented evaluation component is configured to ignore the communication based on the respective reputation values not greater than the threshold value.

6. The system of claim 1, wherein the respective reputation values are adjusted based on validating the identified content as objectionable.

7. The system of claim 1, wherein the processor-implemented evaluation component is configured to receive a communication from an administrator confirming the identified content as objectionable and the processor-implemented reputation component to increase the respective reputation values of the user based on the administrator confirming the identified content as objectionable.

8. The system of claim 1, wherein the processor-implemented evaluation component is configured to receive a communication from an administrator identifying the identified content as not objectionable and the processor-implemented reputation component is configured to decrease the respective reputation values of the user based on the administrator identifying the identified content as not objectionable.

9. A method comprising:
receiving, at a networked system, a communication from a user, the communication identifying content as objectionable within a network-based community; and
evaluating the identified content based on a reputation values of the user to determine an action to take with respect to the identified content, the evaluating of the identified content includes presenting the identified content to an administrator based on the reputation value being between a lower threshold value and an upper threshold value,
wherein the administrator is selected from a list of possible administrators consisting of a customer service representative and an additional user having respective a reputation value greater than the upper threshold value.

10. The method of claim 9, including evaluating the identified content based on a content attribute.

11. The method of claim 9, wherein the action includes removing the content from publication by the networked system.

12. The method of claim 9 wherein the presenting of the identified content to the administrator is based on at least one content attribute.

13. The method of claim 9, wherein the evaluating of the identified content includes communicating the identified content to a queue associated with an administrator based on the respective reputation values.

14. The method of claim 9, wherein the evaluating the content includes transferring the content to an administrator based on the respective reputation values of the user being within a range of threshold values.

15. The method of claim 9, wherein the action to take with respect to the content includes ignoring the communication based on the respective reputation values being below the lower threshold value.

16. The method of claim 9, wherein the evaluating the content includes determining the content is objectionable and adjusting the respective reputation values.

17. A non-transitory machine-readable storage medium that includes instructions to be executed by a machine, the instructions when executed cause the machine to:
determine respective reputation values for a user of a network-based community, the respective reputation values being based on a user attribute associated with the user;
receive a communication from the user identifying content as objectionable within the network-based community;
evaluate the content based on the reputation value of the user to determine an action to take respect to the content, wherein the identified content is presented to an administrator selected from a list of administrators including a customer service representative and one or more other users having respective reputation values greater than a threshold value; and
remove the content identified by the user based on the respective reputation values exceeding a threshold value, the user attribute including at least one user attribute from a list of user attributes consisting of a buyer reputation, a seller reputation, a prior reputation for identifying objectionable content, a reputation in a category, and associations with a different user and feedback associated with the different user.

18. A system, including:
a processor;
a processor-implemented reputation module configured to determine respective reputation values for a user of a network-based community, the respective reputation values being based on a user attribute associated with the user;
a processor-implemented reporting module to receive a communication from the user identifying the content as objectionable within the network-based community; and
an processor-implemented evaluation module to evaluate content based on the respective reputation values of the user,
wherein the processor-implemented evaluation module is configured to present the identified content to an administrator selected from a list of administrators including a customer service representative and one or more other users having respective reputation values greater than a threshold value.

\* \* \* \* \*

UNITED STATES PATENT AND TRADEMARK OFFICE
CERTIFICATE OF CORRECTION

| | | |
|---|---|---|
| PATENT NO. | : 7,966,335 B2 | Page 1 of 1 |
| APPLICATION NO. | : 12/772938 | |
| DATED | : June 21, 2011 | |
| INVENTOR(S) | : Neelakantan Sundaresan et al. | |

It is certified that error appears in the above-identified patent and that said Letters Patent is hereby corrected as shown below:

In column 9, line 52, delete "non-transitory "machine" and insert -- "non-transitory machine --, therefor.

In column 10, line 36, in Claim 1, after "more" insert -- other --.

In column 11, line 23, in Claim 12, delete "claim 9" and insert -- claim 9, --, therefor.

Signed and Sealed this
Ninth Day of August, 2011

David J. Kappos
*Director of the United States Patent and Trademark Office*